UNITED STATES PATENT OFFICE.

ERNEST E. CATHCART, OF TECUMSEH, NEBRASKA.

ARTIFICIAL RUBBER.

1,335,657.  Specification of Letters Patent.  Patented Mar. 30, 1920.

No Drawing.  Application filed September 22, 1917.  Serial No. 192,742.

*To all whom it may concern:*

Be it known that I, ERNEST E. CATHCART, a citizen of the United States, residing at Tecumseh, in the county of Johnson and State of Nebraska, have invented certain new and useful Improvements in Artificial Rubber, and I do hereby declare the following to be a full, clear, and exact description of the invention, such as will enable others skilled in the art to which it appertains to make and use the same.

The object of this invention is the production of a composition filler having substantially the same resilient qualities as rubber, and which is primarily designed to replace the air in any type of pneumatic tire without detracting from the desirable resiliency thereof.

Another object is the provision of a composition filler having a sufficiently heavy body to prevent leakage of the composition in consequence of ordinary punctures of the tire casing.

Another object is the provision of a composition filler for pneumatic tires which will not become liquefied or otherwise effected by variations in the temperature of the casing.

The composition consists of a mixture of glycerin, glue, water, tannic acid and a solution of formaldehyde, and in preparing the composition it is found that the best results are attained by combining the ingredients in substantially the following proportions: Glycerin, two and one-fourth pounds; glue, five and five-eighths pounds; water, nine pounds; tannic acid, two and one-quarter ounces; and a forty per cent. solution of formaldehyde, four ounces.

In compounding the composition, the water and glycerin are first thoroughly mixed together and the tannic acid and glue are successively introduced into the liquid. The glue is preferably in the form of a fine powder, and after having remained in the solution for a sufficient time to become partially softened, the entire solution is heated until the glue is thoroughly dissolved, and the formaldehyde solution is finally stirred into the mixture.

I have found that the composition filler retains its original resiliency or elasticity when effectively protected against the action of light and air and for this reason it is apparent that the protection afforded the filler by the inner tube and casing of a pneumatic tire admirably adapts the filler for use in connection therewith.

In applying the composition to the inner tube the latter is first thoroughly deflated and the composition while warm and in a liquid state is pumped into the tube under pressure. In applying the composition to the conventional types of pneumatic tires, the inner tube is first removed from the outer casing, which latter, as will be understood, has been previously removed from the wheel and the air in the tube is thoroughly exhausted. Adequate means is subsequently applied to the valve stem of the tube to prevent the admission of air while the tube is being replaced in the casing and the latter is replaced upon the wheel rim. The next step is to inject the liquid composition into the casing by means of a pump of the injector type.

What I claim is:

An elastic composition comprising glycerin, two and one-fourth pounds; glue, five and five-eighths pounds; water, nine pounds; tannic acid, two and one-fourth ounces; and a solution of formaldehyde, four ounces.

In testimony whereof I affix my signature in presence of two witnesses.

ERNEST E. CATHCART.

Witnesses:
 FRANK DAFOE,
 MICHAEL DAVEY.